United States Patent
Combs, Jr. et al.

(10) Patent No.: US 10,875,442 B1
(45) Date of Patent: Dec. 29, 2020

(54) BICYCLE MOUNTING SYSTEM

(71) Applicant: Tsuga Canopies LLC, Boone, NC (US)

(72) Inventors: James Broadus Combs, Jr., Zionville, NC (US); James Broadus Combs, Aberdeen, NC (US)

( * ) Notice: Subject to any disclaimer, the term of this patent is extended or adjusted under 35 U.S.C. 154(b) by 0 days.

(21) Appl. No.: 16/602,131

(22) Filed: Aug. 12, 2019

(51) Int. Cl.
| | | |
|---|---|---|
| *B60P 7/08* | (2006.01) | |
| *B62H 1/00* | (2006.01) | |
| *B60R 9/08* | (2006.01) | |
| *B60P 3/079* | (2006.01) | |
| *B60R 9/048* | (2006.01) | |
| *B60P 3/06* | (2006.01) | |
| *B60R 9/10* | (2006.01) | |
| *B60R 9/045* | (2006.01) | |
| *B62H 3/02* | (2006.01) | |
| *B62H 3/10* | (2006.01) | |

(52) U.S. Cl.
CPC ............ *B60P 7/0869* (2013.01); *B60P 3/06* (2013.01); *B60P 3/079* (2013.01); *B60P 7/0823* (2013.01); *B60R 9/045* (2013.01); *B60R 9/048* (2013.01); *B60R 9/08* (2013.01); *B60R 9/10* (2013.01); *B62H 1/00* (2013.01); *B62H 3/02* (2013.01); *B62H 3/10* (2013.01)

(58) Field of Classification Search
CPC .......... B60P 7/0896; B60P 3/06; B60P 3/079; B60P 7/0823; B62H 3/10; B62H 3/02; B62H 1/00; B60R 9/045; B60R 9/08; B60R 9/10; B60R 9/048; B62J 23/00

USPC ................ 410/2, 3, 10, 11, 21, 23, 97, 100; 224/403, 405, 534, 568, 924
See application file for complete search history.

(56) References Cited

U.S. PATENT DOCUMENTS

| | | | |
|---|---|---|---|
| 6,932,550 B1 * | 8/2005 | Hope ...................... | B60P 3/079 410/23 |
| 7,901,169 B2 * | 3/2011 | Slocum ................... | B60P 3/079 410/23 |
| 2003/0129038 A1 * | 7/2003 | Addy ....................... | B60P 3/40 410/97 |
| 2008/0145168 A1 * | 6/2008 | Shaw ...................... | B60P 3/079 410/3 |

* cited by examiner

*Primary Examiner* — Stephen T Gordon

(57) ABSTRACT

A mounting system for mounting a bicycle to the tailgate of a truck bed. The mounting system includes at least a frame pad and a fork pad. The frame pad is directly attached to the bicycle's down tube and includes a handlebar strap that captures the handlebar in a positioning that renders the bicycle unridable. A fork pad for direct attachment to the bicycle's fork. The frame pad and fork pad include multiple layers of textile materials and multiple layers of cushioning materials. The multilayer frame pad and multilayer fork pad provide durability and protection for both the bicycle and the truck. The mounting system allows for easy attachment and detachment directly to the bicycle. By attaching to the bicycle rather than the truck itself, the mounting system avoids damage to the truck's parts and paint. The mounting system's direct attachment to the bicycle rather than to the truck also provides for a much greater ease of use, as compared to the mounting systems of the prior art. The mounting system may also include leashes for added horizontal bicycle stability.

14 Claims, 5 Drawing Sheets

US 10,875,442 B1

BICYCLE MOUNTING SYSTEM

TECHNICAL FIELD

The present invention relates to a mounting system for attaching a bicycle to the bed and tailgate of a pickup truck.

BACKGROUND

Traditional mounts for attaching a bicycle to the bed of a pickup truck come in two basic varieties. The first basic variety of bicycle mounts for a pickup truck bed is a traditional rack system made of hardware consisting of metal or hard plastics. These rack systems are bolted or clamped onto the bed or tailgate of a pickup truck. The second basic variety of bicycle mounts for a pickup truck bed is a pad system made of textiles or soft plastics. These pad systems are attached to a pickup truck bed's tailgate.

The drawbacks of traditional rack systems lie in their mounting hardware and technique of use. Traditional rack systems require aggressive mounting hardware. If the traditional rack systems are attached by screws, nuts, bolts, etc. through-holes must be drilled in the pickup truck's bed for attachment of this hardware. These through-holes are permanent defects in the body of the pickup truck bed that lead to rust, physical faults, and even breakage of the pickup trucks bodywork. If a traditional rack system employs a clamping apparatus for attachment to the pickup truck bed, the clamping force is often so great that it bends, scratched, and otherwise damages the pickup truck's bodywork. In order to attach a bicycle to a traditional rack system many of the following steps are often required: wheels removal, manipulation and attachment of clamping wheel straps, lifting unprotected bicycles over the pickup truck's unprotected painted bodywork, attaching lateral supports, attaching quick-release fork clamps, etc. These steps can be time-consuming and damaging to the pickup truck and the bicycle.

The traditional pad systems are also replete with problems. These traditional pad systems are very difficult to attach to a pickup truck bed's tailgate. The traditional pad systems require straps or other textiles to be negotiated through a small gap between the bottom of the tailgate and the pickup truck bed. This process is so difficult, users rarely remove traditional pad systems in order to avoid this task in the future. Once mounted, traditional pad systems introduce a new variety of problems. While attached to a pickup truck bed's tailgate, a traditional pad system traps water, dirt, and debris against the painted bodywork of the tailgate. This results in rust, scratches, and general damage to the tailgate. Even further, a tradition pad system blocks all sunlight from impinging on the tailgate's painted bodywork. Over time, the ultraviolet rays of the sunlight change the color of the pickup truck's painted bodywork everywhere, except for the paint under the traditional pad system. With prolonged use of a traditional pad system, the color of tailgate's painted bodywork will differ from the color of the pickup truck's remaining painted bodywork.

The present invention addresses these and other problems of traditional systems for mounting bicycles to pickup truck beds and tailgates.

SUMMARY OF THE INVENTION

The mounting system of the present invention solves the drawbacks of the prior art.

The mounting system of the present invention is easily attached directly to the bicycle, rather than the pickup truck. This alleviates any damage to the pickup truck's painted bodywork. The mounting system of the present invention provides protection from damage caused between the bicycle and pickup truck during loading, unloading, and transporting. Being that no portion of the mounting system of the present invention is affixed to any bodywork of the pickup truck, there is no preparatory damage, no immediate damage, and no prolonged damage to the pickup truck's bed, tailgate or bodywork.

The mounting system of the present invention is easily affixed to the bicycle rather than laboriously attached to the pickup truck. The mounting system of the present invention benefits from the size, accessibility, and weight of manipulating a bicycle rather than manipulating portions of a pickup truck during attachment and alleviates many of the drawbacks of the traditional mounting systems. The mounting system of the present invention may be attached on the ground or in the bed of the truck, allowing for greater protection when connecting a bicycle to the tailgate. Once the pads of the present invention are attached to a bicycle, both the bicycle and the pickup truck are substantially protected from damaging each other.

In accordance with these and other objects, which will become apparent hereinafter, the instant invention will now be described with particular reference to the accompanying drawings.

DETAILED DESCRIPTION OF THE DRAWINGS

Following is a list of reference numbers from the Drawings and from the description to follow:
1—Bicycle; 2—Handlebars; 3—Fork; 4—Down tube; 5—Front wheel; 6—Top tube; 20—Truck; 21—Truck bed; 22—Truck tailgate; 100—Frame pad; 101—Frame pad body; 101a—Frame pad body outside layer; 101b—Frame pad body structure layer; 101c—Frame pad body cushion; 101d—Frame pad body inside layer; 102—Handlebar strap; 103—Handlebar strap buckle; 104—First frame pad strap; 105—First frame pad strap connector; 106—Second frame pad strap; 107—Second frame pad strap connector; 108—Tailgate pad; 108a—Tailgate pad first layer; 108b—Tailgate pad cushion layer; 200—Fork pad; 201—Fork pad body; 201a—Fork pad body outside layer; 201b—Fork pad body cushion layer; 201*c*—Fork pad body inside layer; 202—First fork pad strap; 203—First fork pad strap connector; 204—Second fork pad strap; 205—Second fork pad strap connector; 300—Leashes; 301—Leash hook; 302—Leash strap; 303—Leash truck bed connector; 304—Leash strap cinch.

Figure 1:
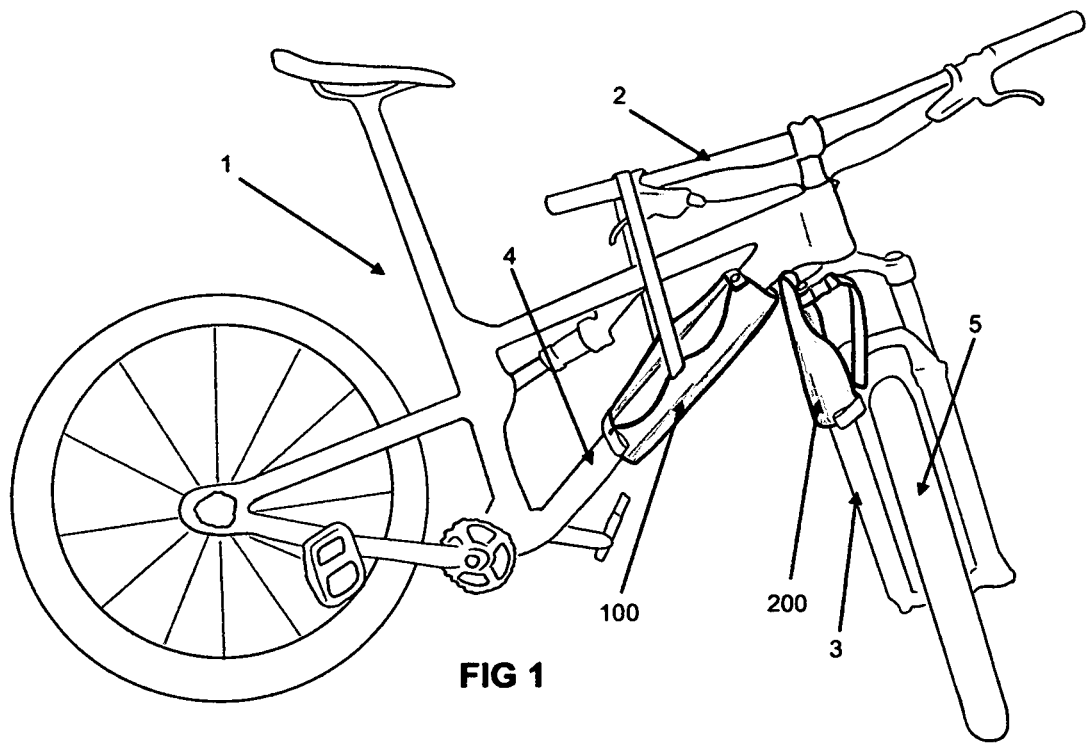
FIG. 1 is a perspective view of the pads of the present invention attached to a bicycle.
Figure 2:
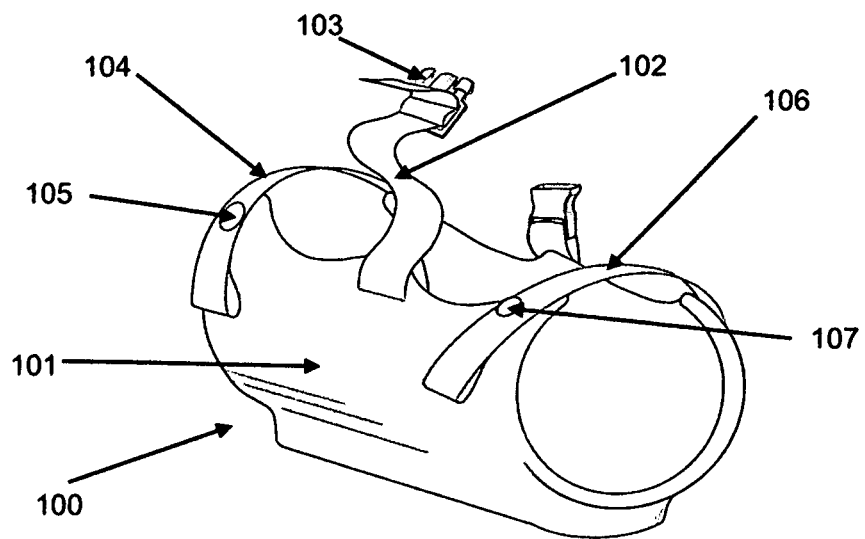
FIG. 2 is a perspective view of the frame pad of the present invention.
Figure 3:
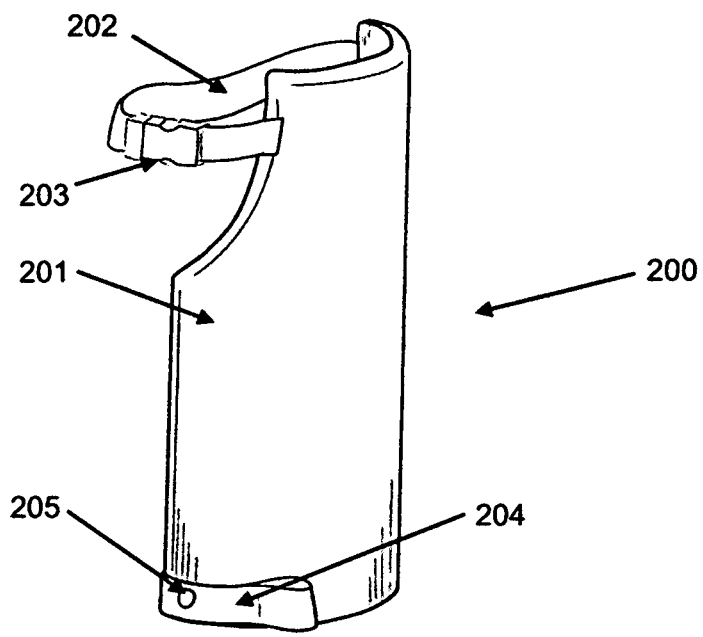
FIG. 3 is a perspective view of the fork pad of the present invention.

Referring to FIGS. 1-3, a bicycle (1) comprises a down tube (4), a front fork (3), a front wheel (5) and handlebars (2). The frame pad (100) is wrapped around the down tube (4) and strapped in place by a first frame pad strap connector (105) of a first frame pad strap (104) and a second frame pad strap connector (107) of a second frame pad strap (106). The first and second frame pad straps (104 and 106) may be made of any flexible material, but are preferably a textile and are more preferably a webbing textile. The first and second frame pad strap connectors (105 and 107) may comprise any combination of snaps, buckles, clips, buttons, etc. The frame pad (100) comprises a handlebar strap (102). The handlebar strap (102) is integrated into the frame pad body (101) at a proximal end and comprises a handlebar strap buckle (103) at a distal end. With the handlebar strap buckle (103) detached as in FIG. 2, the handlebar strap (102) is wrapped over the handlebar (2) in a manner that when the handlebar strap buckle (103) is attached as in FIG. 1, the handlebar strap (102) captures the bicycle's (1) handlebar (2) in such a manner that the handlebar (2) immobilized with a front wheel (5) oriented perpendicular to the down tube (4). In this configuration, both the handlebar (2) and the bicycle (1) are immobilized and prepared for mounting to a tailgate (22) of a truck bed (21).

Still referring primary to FIGS. 1-3, further protection for the bicycle (1) and truck (20) is provided by attaching the fork pad (200) to the front fork (3). First fork pad strap (202) and second fork pad strap (204) are attached to fork (3) using first fork pad strap connector (203) and second fork pad strap connector (205), respectively. The first and second fork pad straps (202 and 204) may be made of any flexible material, but are preferably a textile and are more preferably a webbing textile. The first and second fork pad strap connectors (203 and 205) may comprise any combination of snaps, buckles, clips, buttons, etc. The fork pad (200) is easy to attached and easy to remove from the bicycle (1) fork (3) and provides protection for the paint and integrity of both the bicycle (1) and the truck (20) when the bicycle (1) is mounted to a tailgate (22).

Figure 4:
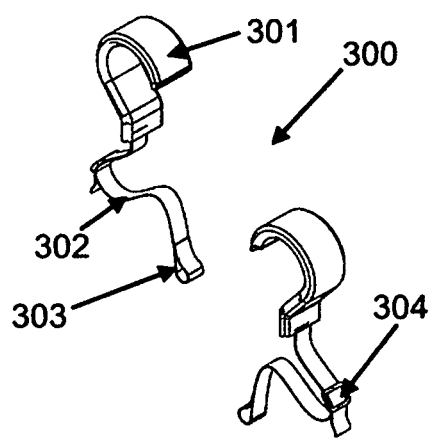
FIG. 4 is a perspective view of the leashes of the present invention.
Figure 5:
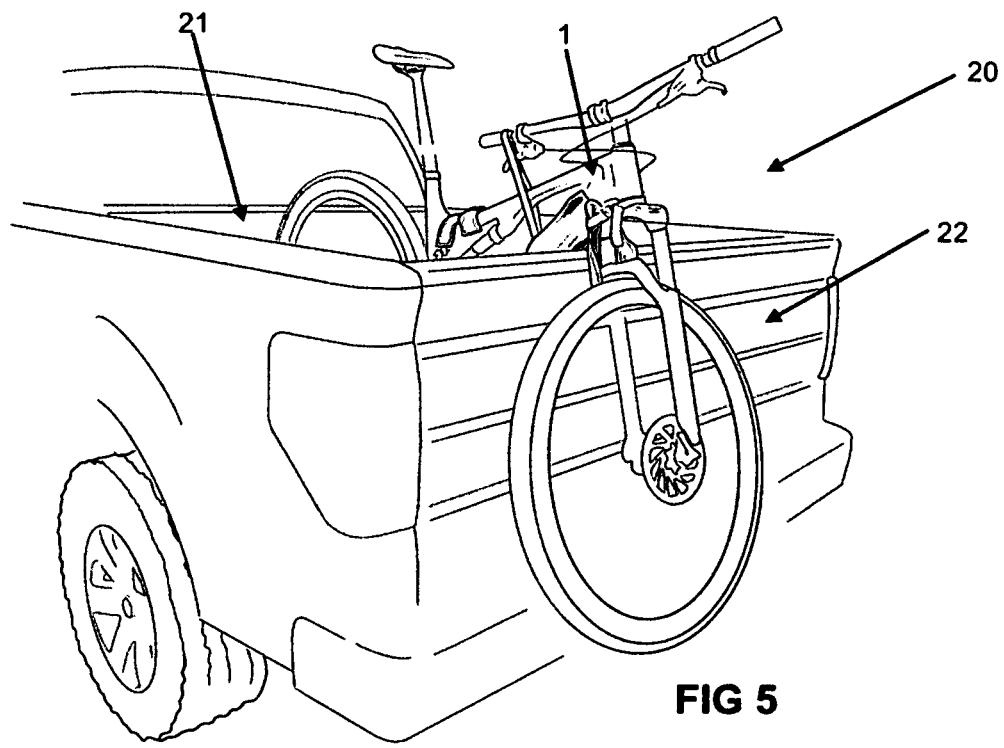
FIG. 5 is a perspective view of the mounting system of the present invention attached to a bicycle mounted in the bed of a pickup truck.
Figure 6:
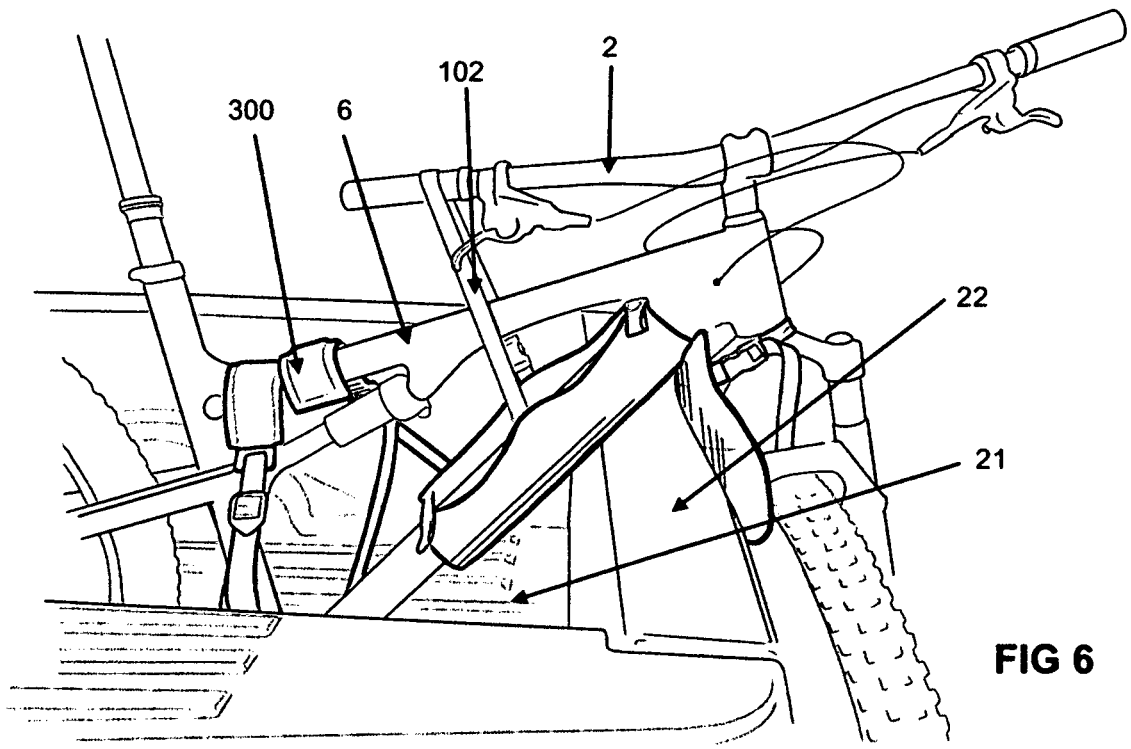
FIG. 6 is a perspective view of the mounting system of the present invention attached to a bicycle mounted in the bed of a pickup truck.

As is seen in FIGS. 4-6, leashes (300) may be used to provide horizontal stability to a bicycle (1) in a mounted position (FIG. 5). The leashes (300) have leash hooks (301) that attached to the top tube of a bicycle (1). The leash hooks (301) may comprise a rigid or resilient material, such as a metal or a plastic. The leash hooks (301) may be be padded and/or sheathed in any combination of a soft textile, a high friction textile, a soft coating, a high friction coating, a plastic, a rubber, a fiber, a paint, a resin, etc. The leash straps (302) are connected to the truck bed (21) via leash truck bed connectors (303). The leash straps (302) are adjustable via leash strap cinch (304). In this manner, the leashes are effective for any size bicycle (1) and any size truck bed (21). The leash straps (302) may be made of any flexible material, but are preferably a textile and are more preferably a webbing textile. The leash strap cinch (304) may be a buckle, clip, ratchet, ring buckle, etc.

Still referring to FIGS. 4-6, the bicycle mounting system (100, 200, and/or 300) effectively stabilizes the bicycle (1) in the bed (21) of a truck (20) with the bicycles (1) down tube (4) and fork (3) straddling the truck's tailgate (22). The frame pad (100) and fork pad (200) protect both the bicycle (1) and the truck (20), while providing an exceptional ease of use. The frame pad (100) and fork pad (200) attach and detach with great simplicity, and the tailgate (22) provides an extraordinarily accessible mounting position.

Figure 7:
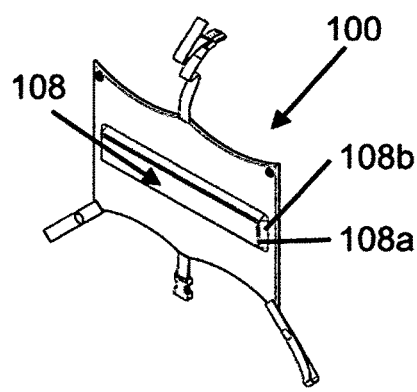
FIG. 7 is a perspective view of the frame pad.

FIG. 7 shows a novel feature that provides even greater protection for the bicycle (1) and truck (20). The frame pad (100) comprises a tailgate pad (108). Tailgate pad (108) is smaller in length and width than the frame pad body (101). The tailgate pad (108) is integral with the frame pad body (101) and is oriented in a position facing away from the bicycle down tube (4) and facing toward the tailgate (22). The tailgate pad (108) comprises as least two layers, a tailgate pad first layer (108*a*) which is positionable against a tailgate (22) and a tailgate pad cushion layer (108*b*) which is integral with the frame pad body (101). The tailgate pad first layer (108*a*) is any flexible material, but is preferably a textile, and more preferably a durable textile such as canvas or synthetic textile, and is most preferably a high friction material made of polyurethane coated knit textile. The tailgate pad cushion layer (108*b*) is preferably a resilient shock absorbing layer, such as foam or rubber or plastic, but is preferably a thick ¾" foam.

Figure 8:
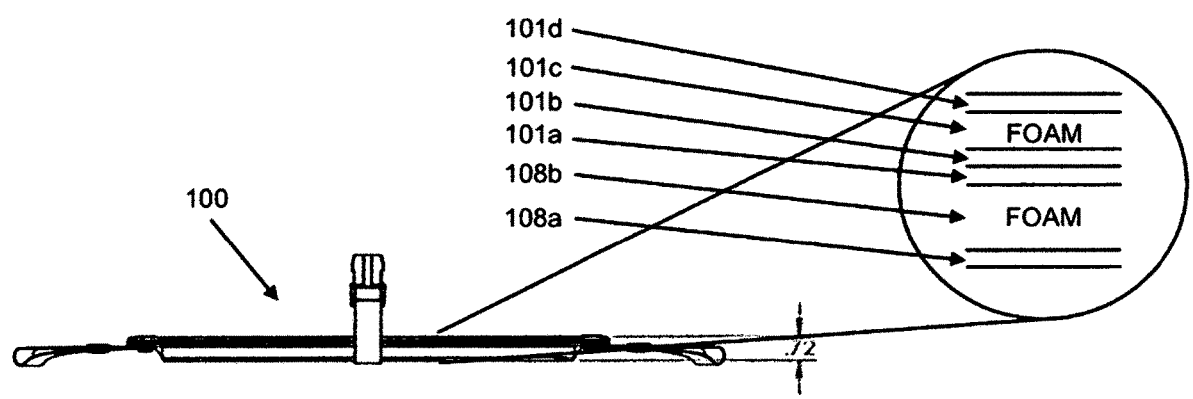
FIG. 8 is a cross-sectional view of the frame pad and a magnified cross section of the frame pad.
Figure 9:
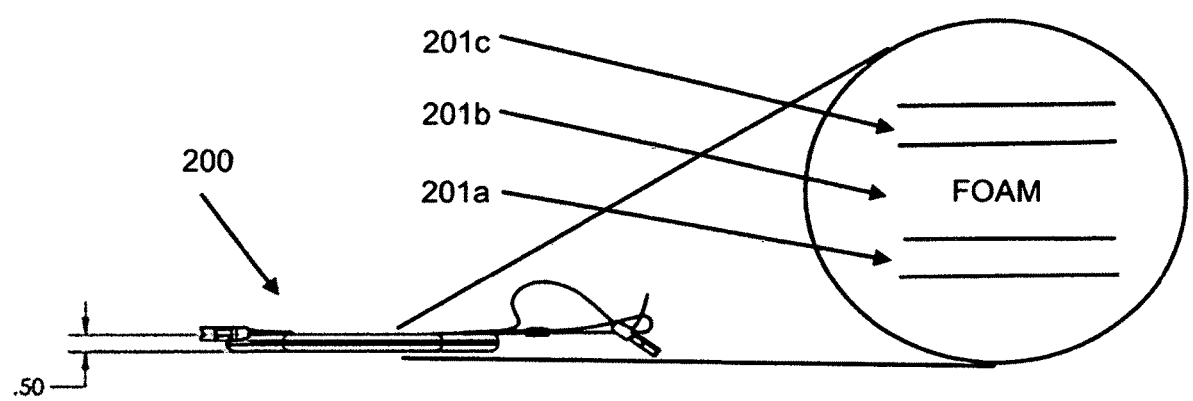
FIG. 9 is a cross-sectional view of the fork pad and a magnified cross section of the fork pad.

In FIGS. 8-9, frame pad (100) and fork pad (200) are shown in cross-section. Each pad (100 and 200) is a multilayer flexible material.

The multilayer frame pad (100) is shown in magnified cross-section in FIG. 8. The frame pad body (101) comprises a frame pad body outside layer (101*a*), frame pad body structure layer (101*b*), a frame pad body cushion (101*c*), and a frame pad body inside layer (101*d*). The frame pad body inside layer (101*d*) is a flexible material, preferably a textile, and even more preferably a soft fabric such as fleece, cotton, polyester, etc. The frame pad body inside layer (101*d*) immediately abuts the bicycle (1) down tube (4) and therefore a soft fabric provides much greater protection for the bicycle (1). The frame pad body cushion (101*c*) is preferably a resilient shock absorbing layer, such as foam or rubber or plastic, and is preferably a ¼" foam. The frame pad body structure layer (101*b*) is preferably a high-density resilient hard plastic. The frame pad body outside layer (101*a*) is any flexible material, but is preferably a textile, and more preferably a durable textile such as canvas or synthetic textile, but most preferably includes a high friction material made of polyurethane coated knit textile. The frame pad body outside layer (101*a*) may come in immediate contact with the tailgate (22) and therefore a durable fabric provides protection for the truck (20) and durability for the frame pad (100). The frame pad body structure layer (101*b*) is provided for protecting the bicycle (1) from impact during transportation, as well as providing structure and shape for the multilayer frame pad (100). In all, the frame pad (100) comprises at least six layers as follows: the frame pad body outside layer (101*a*), the frame pad body structure layer (101*b*), the frame pad body cushion (101*c*), the frame pad body inside layer (101*d*), the tailgate pad first layer (108*a*), and a tailgate pad cushion layer (108*b*). These six layers comprise at least three layers of fabrics for protection and durability, at least two layers of cushioning for shock absorption and further protection, and at least one layer of hard plastic for structure and further protection.

The multilayer fork pad (200) is shown in magnified cross-section in FIG. 9. The fork pad body (201) comprises at least three layers: a fork pad body outside layer (201*a*), fork pad body cushion layer (201*b*), and a fork pad body inside layer (201*c*). The fork pad body inside layer (201*c*) is a flexible material, preferably a textile, and even more preferably a soft fabric such as fleece, cotton, polyester, etc.

The fork pad body inside layer (201c) immediately abuts the bicycle (1) fork (3) and therefore a soft fabric provides much greater protection for the bicycle (1). The fork pad body cushion (201b) is preferably a resilient shock absorbing layer, such as foam or rubber or plastic, and is preferably a ¼" foam. The fork pad body outside layer (201a) is any flexible material, but is preferably a textile, and more preferably a durable textile such as canvas or synthetic textile, but may include a high friction material made of polyurethane coated knit textile. The fork pad body outside layer (201a) may come in immediate contact with the tailgate (22) and therefore a durable fabric provides protection for the truck (20) and durability for the fork pad (200). These three layers comprise at least two layers of fabrics for protection and durability and at least one layer of cushioning for shock absorption and further protection.

Of the foams used for the frame pad body cushion (101c), the tailgate pad cushion layer (108b), and the fork pad body cushion layer (201b), the foam for the tailgate pad cushion layer (108b) is by far the thickest. The tailgate pad cushion layer (108b) is three times thicker than the foam used for the frame pad body cushion (101c) and three time thicker than the foam used for the for pad body cushion layer (201b). The foam used for the frame pad body cushion (101c) and the foam used for the fork pad body cushion layer (201b) may be an identical ¼" foam. The tailgate pad cushion layer (108b) uses a very thick ¾" foam that provides a great deal of protection, but ideally experiences a large amount of compression. This compression deforms the shape of the tailgate pad cushion layer (108b) to match the shape of the surface to which it is mounted, such as a truck bed (21) or tailgate (22). By matching the shape of the surface to which it is mount, the tailgate pad cushion layer (108b) provides ideal stability.

While preferred embodiments of the present invention have been described above, it is understood that variations and modification will be apparent to those skilled in the art, without departing from the scope and spirit of the present invention. The scope of the present invention, therefore, is to be determined solely by the following claims.

We claim:

1. A bicycle mounting system, comprising:
   a multilayer frame pad directly attached to a down tube of a bicycle, said multilayer frame pad includes a frame pad body including at least two layers of frame pad textiles, at least one layer of frame pad cushioning material, and at least one layer of frame pad body structure material, said multilayer frame pad includes a handle bar strap;
   a multilayer fork pad directly attached to a fork of said bicycle, said multilayer fork pad includes a fork pad body including at least two layers of fork pad textiles and at least one layer of fork pad cushioning material;
   wherein said handlebar strap includes a proximal side that is integral with frame pad body and a distal end, said distal end of the handlebar strap includes a connector;
   wherein said handlebar strap captures a handlebar of said bicycle such that the handlebar is in an immobile position parallel with said down tube so that a wheel of said bicycle is perpendicular to the said down tube rendering said bicycle unridable;
   and wherein a vertical portion of a truck bed is sandwiched between said multilayer frame pad and said multilayer fork pad.

2. The bicycle mounting system of claim 1;
   wherein said multilayer frame pad includes a multilayer tailgate pad;
   and wherein said multilayer tailgate pad includes a tailgate pad cushion layer that is integrally attached to said frame pad body and a tailgate pad textile layer that contacts said vertical portion of said truck bed sandwiched between said multilayer frame pad and said multilayer fork pad.

3. The bicycle mounting system of claim 2;
   wherein said frame pad body has a length, a width, and a thickness;
   wherein said multilayer tailgate pad has a length, a width, and a thickness;
   and wherein the width of the multilayer tailgate pad is less than the width of the frame pad body.

4. The bicycle mounting system of claim 3;
   wherein the length of the multilayer tailgate pad is less than the length of the frame pad body.

5. The bicycle mounting system of claim 1;
   further comprising a leash;
   wherein said leash includes a leash hook, a leash strap, a leash truck bed connector, and a leash strap cinch;
   wherein said leash strap cinch adjusts a length of the leash strap.

6. The bicycle mounting system of claim 5;
   wherein said leash includes a plurality of leashes;
   said plurality of leashes are connected to opposite sides of said truck bed via the leash truck bed connectors and apply stabilizing and opposing pulling pressure to said bicycle via leash hooks.

7. The bicycle mounting system of claim 1;
   wherein said vertical portion of said truck bed is a tailgate.

8. The bicycle mounting system of claim 4;
   wherein said at least two layers of frame pad textiles comprises a frame pad inner textile and a frame pad outer textile;
   wherein said frame pad inner textile and said frame pad outer textile are materially different textiles.

9. The bicycle mounting system of claim 8;
   wherein said at least two layers of fork pad textiles comprises a fork pad inner textile and a fork pad outer textile;
   wherein said fork pad inner textile and said fork pad outer textile are materially different textiles.

10. The bicycle mounting system of claim 9;
    wherein said frame pad inner textile is made of a fleece textile;
    and wherein said fork pad inner textile is made of a fleece textile.

11. The bicycle mounting system of claim 10;
    wherein the at least one layer of frame pad cushioning material is a foam;
    and wherein the at least one layer of fork pad cushioning material is a foam.

12. The bicycle mounting system of claim 11;
    wherein said tailgate pad textile layer is made of a polyurethane coated knit textile;
    and wherein a tailgate pad cushion layer is made of foam.

13. The bicycle mounting system of claim 12;
    wherein said frame pad body structure material is a resilient high density hard plastic.

14. The bicycle mounting system of claim 11;
    wherein said tailgate pad cushion layer is at least three times thicker than said frame pad cushioning material.

* * * * *